United States Patent [19]

Myers

[11] Patent Number: 4,962,067
[45] Date of Patent: * Oct. 9, 1990

[54] ERBIUM LASER GLASS COMPOSITIONS

[75] Inventor: John D. Myers, Hilton Head Island, S.C.

[73] Assignee: Kigre, Inc., Hilton Head Island, S.C.

[ * ] Notice: The portion of the term of this patent subsequent to Sep. 13, 2006 has been disclaimed.

[21] Appl. No.: 379,990

[22] Filed: Jul. 14, 1989

[51] Int. Cl.$^5$ ............................................... C03C 3/16
[52] U.S. Cl. .......................................... 501/45; 501/48; 252/301.21; 252/301.4 P; 252/301.6 P
[58] Field of Search ................. 501/45, 48; 252/301.2, 252/301.4 P

[56] References Cited

U.S. PATENT DOCUMENTS 3,533,956  10/1970  Snitzer ............................ 252/301.5
4,770,811   9/1988  Myers ........................... 252/301.4 P

*Primary Examiner*—William R. Dixon Jr.
*Assistant Examiner*—Paul Marcantoni
*Attorney, Agent, or Firm*—Dykema Gossett

[57] ABSTRACT

Phosphate laser glass compositions which include erbium ions as the active laser ion material. In one aspect, ytterbium, chromium and cerium ions are present as auxiliary dopants. The ytterbium, chromium and cerium additives serve to sensitize the erbium-doped phosphate glasses of the present invention. The glasses are particularly useful in applications where an "eye-safe" wavelength is desirable.

14 Claims, 1 Drawing Sheet

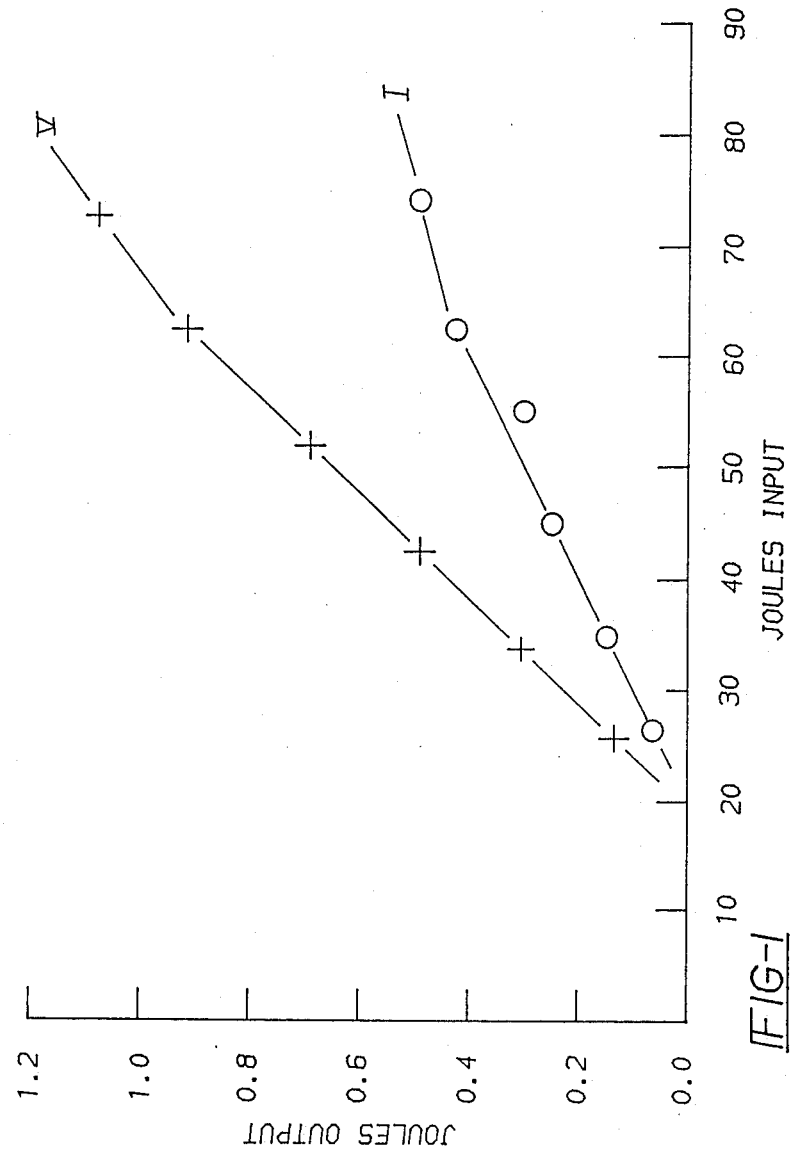

ERBIUM LASER GLASS COMPOSITIONS

TECHNICAL FIELD

The present invention relates generally to laser glass compositions. More specifically, the present invention provides phosphate laser glass compositions which include erbium and a sensitized erbium laser glass which includes, cerium, ytterbium, and chromium dopants. The erbium laser glasses of the present invention are characterized by low thermal distortion and operate at an eye-safe wavelength.

BACKGROUND OF THE INVENTION

As will be known to those skilled in the art, lasers produce a narrow, high-intensity beam of monochromatic light and are used in a number of industrial, research and medical applications. Lasers consist generally of three fundamental components, i.e., a power supply, a resonator and a laser or "lasing" material. There are several classifications of lasers, such as free-electron lasers, dye lasers, and semiconductor lasers, with each type of laser being distinguished by its components and operating characteristics. The present invention relates to one of the most common types of lasers, solid-state lasers. In a solid-state laser, the laser material is either a crystal or a glass. Early solid-state lasers utilized a long-thin ruby crystal rod. As will be explained more fully, in order to create a composition which can be stimulated to emit electromagnetic radiation in the form of a laser beam, certain impurities or "dopants" are added to the laser material.

As with other types of lasers, solid-state lasers have a resonator cavity with internal reflective ends. A rod of laser material is positioned longitudinally within the resonator cavity between the end mirrors. A "pumping source" such as a xenon flashlamp is mounted in the resonator cavity and is used to optically pump the laser rod. Photons produced by the stimulated emission of the laser material along the axis between the mirrors are thereby reflected such that a concentrated beam of light is produced within the cavity. An aperture or other means is provided at one of the mirrors, known as the output mirror, which allows a fraction of the laser light to project out of the cavity in the form of a laser beam.

The process by which stimulated emission of light occurs is best described with reference to the energy states of the dopant ions. As stated, the laser material includes a host material such as a phosphate glass into which specific impurities are added. It is the presence of these impurities which give rise to laser activity. Generally, there is a primary laser dopant, the stimulated emission of which is responsible for the laser beam. There may also be auxiliary dopants which "sensitize" the laser glass. The dopants are typically added as oxides to the host material during preparation of the glass melt. The dopant ions have discrete or "quantized" energy levels. Each ion can be excited to move from a ground-state energy level to a higher or excited energy state. In many instances, several energy levels are suitable for a given ion. The dopant ions can move between these energy levels during laser operation by the absorption and emission of photons. Only those photons having precisely the amount of energy necessary to raise an ion from an initial level to a higher level or state are absorbed by the ion. In turn, an ion moving from a higher energy state to a lower state gives off a photon having the same characteristic energy. The release or emission of a photon by an excited ion can occur as a spontaneous decay to a lower energy state or by stimulated emission. Stimulated emission occurs when an ion in an excited state is struck by a photon of precisely the same energy as the photon which raised the ion into the excited state. Thus, it will be appreciated that the stimulating photon has the same energy as the photon which is released following stimulation. In this manner, two coherent photons exist following a stimulated emission.

In operation, the laser material is optically pumped by the flashlamp. Many of the dopant ions are then elevated to excited states from which they decay spontaneously as previously described. In order for stimulated emission to occur, a population inversion must be created by the flashlamp. Accordingly, the laser material is optically pumped such that the number of ions in excited states exceed the number of these ions at lower energy levels. When a population inversion exists, a spontaneous emission has a greater probability of stimulating the emission of a photon by another excited ion than being absorbed by an ion at a lower energy level.

In the confines of a resonator cavity, the ability of a spontaneous or stimulated emission of a photon to stimulate the emission of another photon is amplified by reflecting the photons between the mirrors at the ends of the resonator cavity. As the photons oscillate along the axis of the cavity, they repeatedly pass through the lasing material, causing the stimulated release of additional photons having the same energy. In this fashion, a narrow beam of coherent, monochromatic light is produced, a fraction of which is allowed to escape the resonator cavity as a laser beam.

It is known that the basic interaction of photons and ions which produce a laser beam can be augmented by the use of auxiliary dopants. More specifically, pump ions can be added to the host material along with the laser ion. Both the laser ion and the pump ion are optically pumped to higher energy levels by the optical pumping means. As will be appreciated, after a laser ion in an excited state emits a photon, either spontaneously or as a stimulated emission, it moves to a lower energy state. The laser ion can then be pumped back into the higher energy level by the flashlamp or by a photon emitted from the pump ion. Auxiliary dopants may interact synergistically among themselves and with the primary laser ion to produce lasers having higher efficiencies.

As previously indicated, a number of host materials are available for use in forming laser rods, including silicate and phosphate-based glasses. Due to its superior chemical durability and low laser threshold, phosphate laser glass has replaced silicate laser glass in many applications. Those skilled in the art will also appreciate that laser glass provides a number of advantages over the use of crystal laser media. Moreover, it is known that the success of a multi-dopant system in a laser crystal may not necessarily translate into a successful laser glass. Similarly, dopant systems are not per se interchangeable between silicate glass and phosphate glass.

In U.S. Pat. No. 4,770,811 to Myers, entitled "Sensitized Laser Glass," which is assigned to the assignee of the present invention, and the disclosure of which is incorporated herein by reference, a sensitized phosphate laser glass composition is disclosed in which the primary glass constituent is $P_2O_5$. As described in the aforementioned patent, it was found that the addition of specified amounts of cerium and chromium to the glass as auxiliary dopants, along with either a neodymium or erbium primary dopant, improved the efficiency and sensitivity of the laser glass. In theory, the auxiliary dopants absorb energy in regions of the flashlamp emission spectrum away from the absorption bands of the primary dopant and then serve as pumping ions for the primary dopant.

In U.S. Pat. No. 3,533,956 to Snitzer, a laser material is disclosed which utilizes laser ions selected from the group of erbium, holium and thulium. Sensitizer ions are added which are selected from the group consisting of a ytterbium, erbium, neodymium, thulium, chromium and uranyal. It is stated that the system is useful in glasses, including phosphate glasses. In a paper by Thornton et al., entitled "Erbium Laser Technology," a sensitized YAG (yttrium-aluminum-garnet) crystal laser host material is disclosed which utilizes erbium, ytterbium and cerium as dopants. However, the absorption spectra of this material suggested that tetravalent cerium ions were produced during growth of the crystal, accounting for a lack of trivalent cerium ion absorption.

Phosphate-based laser glasses containing neodymium, ytterbium and erbium are also known. In a report by Woodcock, entitled "Multiple Doped Erbium Laser Materials," it is stated that a series of melts of zinc-aluminum-phosphate glasses were made which contained $Y_2O_3$. It is also stated therein that in most instances these glasses also contain $Nd_2O_3$. Additional sensitizing agents were generally present, such as $CeO_2$, MnO, $Cr_2O_3$, $UO_2$, $MoO_3$, PbO or $Sb_2O_3$, and $CeO_2$ was frequently added in combination with the latter oxides. Two of the melts described in the aforementioned paper included neodymium, ytterbium, cerium and chromium. The aforementioned paper further states that fluorescent lifetime measurements of the $Yb^{3+}$-ion indicated that quenching was taking place due to the presence of $Cr^{3+}$-ions.

SUMMARY OF THE INVENTION

In one aspect, the present invention provides a phosphate laser glass composition which includes approximately 50 to 65 mole percent $P_2O_5$; approximately 10 to 30 mole percent $R_2O$, where $R_2O$ is selected from the group consisting of $Li_2O$, $Na_2O$, $K_2O$, $Rb_2O$, $Cs_2O$ and combinations thereof; approximately 5 to 25 mole percent MO, where MO is selected from the group consisting of MgO, CaO, SrO, BaO, ZnO and combinations thereof; up to approximately 10 mole percent $Al_2O_3$; up to approximately 1 mole percent $Nb_2O_5$; up to approximately 4 mole percent $CeO_2$; approximately 0.01 to 0.15 mole percent $Er_2O_3$; up to approximately 0.2 mole percent $Nd_2O_3$; and from approximately 2 mole percent to the limit of solubility of $Yb_2O_3$. As used herein, "the limit of solubility" shall mean that amount of $Yb_2O_3$ which will go into solution in the melt at about 1400° C., typically a maximum of about 25.0 mole percent.

In another aspect, the present invention provides in a preferred embodiment phosphate-based laser glass compositions which utilize erbium ions as the active laser species along with ytterbium, cerium and chromium ions as auxiliary dopants to produce a sensitized laser glass. In a preferred embodiment, the laser glasses of the present invention are used to form high-gain, athermal laser glass rods which exhibit constant beam divergence, demonstrate good chemical durability, and which are extremely energy efficient. The preferred phosphate laser glass compositions of the present invention are characterized by very low thermal distortion and undergo a negative change in refractive index with temperature which significantly compensates for their positive coefficient of thermal expansion. These and other objects, advantages and features of the invention will now be described in connection with the detailed description of the preferred embodiments with reference to the drawing in which:

BRIEF DESCRIPTION OF THE DRAWING

FIG. 1 illustrates the input/output energy characteristics of the laser glasses of the present invention.

DETAILED DESCRIPTION OF THE PREFERRED EMBODIMENTS OF THE INVENTION

In one embodiment, the present invention provides an excellent laser glass composition which includes approximately 50 to 65 mole percent $P_2O_5$; approximately 10 to 30 percent $R_2O$, where $R_2O$ is selected from the group consisting of $Li_2O$, $Na_2O$, $K_2O$, $Rb_2O$, $Cs_2O$ and combinations thereof; approximately 5 to 25 mole percent MO, where MO is selected from the group consisting of MgO, CaO, SrO, BaO, ZnO and combinations thereof; approximately 0 to 10 mole percent $Al_2O_3$; approximately 0 to 1.0 mole percent $Nb_2O_5$; approximately 0 to 0.5 mole percent $Sb_2O_3$; approximately 0 to 4 mole percent $CeO_2$; approximately 0.01 to 0.15 mole percent $Er_2O_3$; approximately 0 to 0.2 mole percent $Nd_2O_3$; and $Yb_2O_3$, where $Yb_2O_3$ is present in a concentration of from approximately 0.1 mole percent to its limit of solubility in the laser glass composition.

In a more preferred embodiment, the foregoing constituents are present in the following concentrations: approximately 55 to 60 mole percent $P_2O_5$; approximately 12 to 25 mole percent $R_2O$; approximately 8 to 20 mole percent MO; approximately 1 to 8 mole percent $Al_2O_3$; approximately 0 to 0.8 mole percent $Nb_2O_5$; approximately 0 to 0.4 mole percent $Sb_2O_3$; approximately 0 to 3.5 mole percent $CeO_2$; approximately 0.02 to 0.10 mole percent $Er_2O_3$; approximately 0 to 0.18 mole percent $Nd_2O_3$; and approximately 3 mole percent to the limit of solubility $Yb_2O_3$.

In the most preferred embodiment, the laser glass composition comprises approximately 55 to 60 mole percent $P_2O_5$; approximately 15 to 20 mole percent $R_2O$, where $R_2O$ is selected from the aforementioned defined group; approximately 10 to 15 mole percent MO, where MO is selected from the aforementioned defined group; approximately 2 to 5 mole percent $Al_2O_3$; approximately 0.2 to 0.7 mole percent $Nb_2O_5$; approximately 0.1 to 0.3 mole percent $Sb_2O_5$; approximately 1.0 to 3.0 mole percent $CeO_2$; approximately 0.03 to 0.08 mole percent $Er_2O_3$; approximately 0.0 to 0.15 mole percent $Nd_2O_3$; and approximately 4.0 mole percent to the limit of solubility $Yb_2O_3$.

TABLE I

| | RANGES IN MOLE % | | |
|---|---|---|---|
| | BROAD | PREFERRED | MOST PREFERRED |
| $P_2O_5$ | 50 to 65 | 50 to 60 | 55 to 60 |
| $R_2O$ | 10 to 30 | 12 to 25 | 15 to 20 |
| MO | 5 to 25 | 8 to 20 | 10 to 15 |
| $Al_2O_3$ | 0 to 10 | 1 to 8 | 2 to 5 |
| $Nb_2O_5$ | 0 to 1 | 0 to 0.8 | 0.2 to 0.7 |
| $Sb_2O_3$ | 0 to 0.5 | 0 to 0.4 | 0.1 to 0.3 |
| $CeO_2$ | 0 to 4 | 0 to 3.5 | 1.0 to 3.0 |
| $Er_2O_3$ | 0.01 to 0.15 | 0.02 to 0.10 | 0.03 to 0.08 |
| $Nd_2O_3$ | 0 to 0.2 | 0 to 0.18 | 0.0 to 0.15 |
| $Yb_2O_3$ | 0.1 to limit | 3 to limit | 4 to limit |

TABLE I-continued

| RANGES IN MOLE % | | |
|---|---|---|
| BROAD | PREFERRED | MOST PREFERRED |
| of solubility | of solubility | of solubility | where
$R_2O$ = $Li_2O$, $Na_2O$, $K_2O$, $Rb_2O$, $Cs_2O$
MO = MgO, CaO, SrO, BaO, ZnO The aforementioned glass compositions are particularly suited for "eye-safe" applications due to their emission wavelength of approximately 1.54 microns and they exhibit low thermal distortion and a negative change in refractive index with increase in temperature. The thermal coefficient for optical path length (w) as determined by the equation:

$$w = dn/dt + \alpha(n-1),$$

is quite low.

In another embodiment of the present invention, a composition is provided which is also useful as a laser material in solid-state lasers. In a preferred embodiment the inventive composition comprises a sensitized phosphate layer glass which contains erbium ($Er^{3+}$) ions as the active laser ion and ytterbium ($Yb^{3+}$), cerium ($Ce^{3+}$) and chromium ($Cr^{3+}$) ions as auxiliary dopants. The dopants are present in concentrations which have unexpectedly produced a high-efficiency laser glass composition. It has been found that the addition of these dopants results in an unexpected synergism which produces a high-gain, energy-efficient laser material.

While not intending to be bound by theory, it is believed that the ytterbium ions serve as intermediate pumping ions which receive energy from $Cr^{3+}$ ions which are in turn excited by optical pumping during laser operation. The energy level match-up between ytterbium and erbium is favorable, and $Yb^{3+}$ ions serve as the primary sensitizer. It will be appreciated by those skilled in the art that sensitization in this manner allows a relatively low erbium concentration to be utilized such that the necessary population inversion can be more readily achieved. Thus, while the direct pumping of erbium by $Cr^{3+}$ ions would be relatively inefficient, the utilization of chromium, ytterbium and erbium results in an efficient ion pumping scheme. It is also believed that cerium is effective in further increasing the energy utilization of the chromium, ytterbium and erbium dopants by controlling the oxidation state of the chromium ions. It is theorized that cerium chemically controls the oxidation state of chromium at $Cr^{3+}$, thereby preventing the formation of higher oxidation states such as $Cr^{4+}$ and $Cr^{6+}$. The laser glasses of the present invention are relatively athermal and demonstrate a negative change in refractive index with temperature which nearly compensates for their positive coefficient of thermal expansion.

More specifically, in one embodiment the preferred host glass material of the present invention is a phosphate-based glass which includes a constituent $R_2O$, where $R_2O$ is selected from the group consisting of $Li_2O$, $Na_2O$, $K_2O$, $Rb_2O$, $Cs_2O$, and combinations thereof. The preferred phosphate-based glass composition of the present invention further includes a constituent MO, where MO is selected from the group consisting of MgO, CaO, SrO, BaO, ZnO and combinations thereof. As optional ingredients for use in the present invention in preparing the host glass, $Al_2O_3$, $Nb_2O_5$, $Sb_2O_3$ and combinations thereof may be included in the phosphate laser glass composition. It may be also suitable in some applications to include an additional dopant, $Nd_2O_3$.

In one embodiment, the phosphate-based laser glass composition of the present invention includes approximately 50 to approximately 65 mole percent $P_2O_5$; approximately 10 to approximately 30 mole percent $R_2O$, where $R_2O$ is selected from the group consisting of $Li_2O$, $Na_2O$, $K_2O$, $Rb_2O$, $Cs_2O$ and combinations thereof; approximately 5 to approximately 25 mole percent MO, where MO is selected from the group consisting of MgO, CaO, SrO, BaO, ZnO, and combinations thereof; approximately 0.0 to 6.0 mole percent $CeO_2$; approximately 0.01 to approximately 0.6 mole percent $Er_2O_3$; approximately 0.1 mole percent to the limit of solubility of $Yb_2O_3$; and approximately 0.0 to approximately 0.1 mole percent $Cr_2O_3$ As optional ingredients, the phosphate laser glass compositions of the present invention may include up to approximately 10 mole percent $Al_2O_3$; up to approximately 1 mole percent $Nb_2O_5$; and up to approximately 0.5 mole percent $Sb_2O_3$ Additionally, the phosphate laser glass compositions of the present invention may include up to approximately 0.2 mole percent $Nd_2O_3$. It will be appreciated by those skilled in the art that as the concentration of $Yb_2O_3$ increases toward the limit of solubility, the liquidus temperature of the glass increases to a point at which the further addition of $Yb_2O_3$ is impractical. A typical practical limit of $Yb_2O_3$ is approximately 15 mole percent, but it may be desirable to have higher concentrations, particularly in fabricating small laser rods, for example in fiber laser applications.

These broad ranges of ingredients provide high-efficiency laser glass compositions which are essentially athermal and which have a negative index of refraction. In a more preferred embodiment the laser glass of the present invention comprises approximately 55 to approximately 60 mole percent $P_2O_5$; approximately 12 to approximately 25 mole percent $R_2O$, where $R_2O$ is selected from the group consisting of $Li_2O$, $Na_2O$, $K_2O$, $Rb_2O$, $Cs_2O$ and combinations thereof; approximately 8 to approximately 20 percent MO, where MO is selected from the group consisting of MgO, CaO, SrO, BaO, ZnO, and combinations thereof; approximately 1 to approximately 8 mole percent $Al_2O_3$; up to approximately 0.8 mole percent $Nb_2O_5$; up to approximately 4 mole percent $Sb_2O_3$; approximately 0.1 to approximately 5.0 mole percent $CeO_2$; approximately 0.02 to approximately 0.07 mole percent $Cr_2O_3$; approximately 0.02 to approximately 0.50 mole percent $Er_2O_3$; and approximately 3 mole percent to the limit of solubility $Yb_2O_3$ Optionally, up to approximately 0.18 mole percent $Nd_2O_3$ can be included.

In the most preferred embodiment, the present invention provides a phosphate laser glass composition having erbium as the primary laser dopant and which includes approximately 55 to approximately 60 mole percent $P_2O_5$; approximately 15 to approximately 20 percent $R_2O$, where $R_2O$ is selected from the group consisting of $Li_2O$, $Na_2O$, $K_2O$, $Rb_2O$, $Cs_2O$ and combinations thereof; approximately 10 to approximately 15 mole percent MO, where MO is selected from the group consisting of MgO, CaO, SrO, BaO, ZnO, and combinations thereof; approximately 2 to approximately 5 mole Percent $Al_2O_3$; approximately 0.2 to 0.7 mole percent $Nb_2O_5$; approximately 0.1 to 0.3 mole percent $Sb_2O_3$; approximately 1 to approximately 4 mole percent $CeO_2$; approximately 0.03 to approximately 0.1 mole percent $Er_2O_3$; approximately 4 mole percent to the limit of solubility $Yb_2O_3$; approximately 0.04 to approximately 0.06 mole percent $Cr_2O_3$; and approximately 0.05 to 0.15 mole percent $Nd_2O_3$ These broad, preferred and most preferred ranges are set forth in tabular form in the following Table II.

TABLE II

| | Ranges in Mole % | | |
|---|---|---|---|
| | Broad Range | Preferred | Most Preferred |
| $P_2O_5$ | 50 to 65 | 50 to 60 | 55 to 60 |
| $R_2O$ | 10 to 30 | 12 to 25 | 15 to 20 |
| MO | 5 to 25 | 8 to 20 | 10 to 15 |
| $Al_2O_3$ | 0 to 10 | 1 to 8 | 2 to 5 |
| $Nb_2O_5$ | 0 to 1 | 0 to 0.8 | 0.2 to 0.7 |
| $Sb_2O_3$ | 0 to 0.5 | 0 to 4.0 | 0.1 to 0.3 |
| $CeO_2$ | 0.0 to 6.0 | 0.1 to 5.0 | 1.0 to 4.0 |
| $Er_2O_3$ | 0.01 to 0.6 | 0.02 to 0.5 | 0.03 to 0.1 |
| $Nd_2O_3$ | 0 to 0.2 | 0 to 0.18 | 0.05 to 0.15 |
| $Yb_2O_3$ | 0.1 to limit of solubility | 3 to limit of solubility | 4 to limit of solubility |
| $Cr_2O_3$ | 0.0 to 0.1 | .02 to .07 | .04 to .06 |

The preferred phosphate laser glass compositions of the present invention have an emission wavelength of 1.54 microns and are therefore particularly useful in those applications where "eye-safe" wavelengths are needed such as in range-finding applications and the like.

The following examples are provided to more fully illustrate the present invention and are in no way intended to limit its scope:

EXAMPLES

In the following the concentrations of cerium and chromium were varied to determine the effects of sensitization with ytterbium, cerium and chromium on energy output at a constant input in the erbium-doped phosphate glass compositions of the present invention. Concentrations in Example I are mole percent while in examples II - X all concentrations are in weight percent (totals may vary from 100% due to rounding off).

EXAMPLE I

| | | | |
|---|---|---|---|
| $P_2O_5$ | 60.0 | $CeO_2$ | 2.0 |
| $K_2O$ | 16.0 | $Yb_2O_3$ | 6.0 |
| CaO | 13.0 | $Er_2O_3$ | 0.05 |
| $Al_2O_3$ | 2.0 | $Nd_2O_3$ | 0.1 |
| $Nb_2O_5$ | 1.0 | | |
| $Sb_2O_3$ | 0.3 | | |
| Calculated properties: | | $n = 1.553$ | |
| | | $x = 123 \times 10^{-7}/°C.$ | |
| | | $dn/dt = 64 \times 10^{-7}/°C.$ | |
| | | $w = 4 \times 10^{-7}/°C.$ | |

EXAMPLE II

| | | | |
|---|---|---|---|
| $P_2O_5$ | 54.0 | CeO | 0 |
| $L_2O$ | 10.0 | $Nb_2O_3$ | 1.00 |
| CaO | 13.0 | $SbO_3$ | 0.50 |
| $Yb_2O_3$ | 17.0 | $Er_2O_3$ | 0.1 |
| $Al_2O_3$ | 2.0 | $Cr_2O_3$ | 0.05 |

EXAMPLE III

| | | | |
|---|---|---|---|
| $P_2O_5$ | 54.0 | CeO | 1.0 |
| $K_2O$ | 10.0 | $Nb_2O_3$ | 1.00 |
| CaO | 13.0 | $SbO_3$ | 0.50 |
| $Yb_2O_3$ | 17.0 | $Er_2O_3$ | 0.1 |
| $Al_2O_3$ | 2.0 | $Cr_2O_3$ | 0.05 |

EXAMPLE IV

| | | | |
|---|---|---|---|
| $P_2O_5$ | 54.0 | CeO | 2.0 |
| LiO | 10.0 | $Nb_2O_3$ | 1.00 |
| CaO | 13.0 | $SbO_3$ | 0.50 |
| $Yb_2O_3$ | 17.0 | $Er_2O_3$ | 0.10 |
| $Al_2O_3$ | 2.0 | $Cr_2O_3$ | 0.05 |

EXAMPLE V

| | | | |
|---|---|---|---|
| $P_2O_5$ | 54.0 | CeO | 3.0 |
| $K_2O$ | 10.0 | $Nb_2O_3$ | 1.00 |
| SrO | 13.0 | $SbO_3$ | 0.5 |
| $Yb_2O_3$ | 17.0 | $Er_2O_3$ | 0.1 |
| $Al_2O_3$ | 2.0 | $Cr_2O_3$ | 0.05 |

EXAMPLE VI

| | | | |
|---|---|---|---|
| $P_2O_5$ | 54.0 | CeO | 4.0 |
| $K_2O$ | 10.0 | $Nb_2O_3$ | 1.00 |
| SrO | 13.0 | $SbO_3$ | 0.50 |
| $Yb_2O_3$ | 17.0 | $Er_2O_3$ | 0.1 |
| $Al_2O_3$ | 2.0 | $Cr_2O_3$ | 0.05 |

EXAMPLE VII

| | | | |
|---|---|---|---|
| $P_2O_5$ | 54.0 | CeO | 2.0 |
| $K_2O$ | 10.0 | $Nb_2O_3$ | 1.00 |
| ZnO | 13.0 | $SbO_3$ | 0.50 |
| $Yb_2O_3$ | 17.0 | $Er_2O_3$ | 0.10 |
| $Al_2O_3$ | 2.0 | $Cr_2O_3$ | .03 |

EXAMPLE VIII

| | | | |
|---|---|---|---|
| $P_2O_5$ | 54.0 | CeO | 2.0 |
| $K_2O$ | 10.0 | $Nb_2O_3$ | 1.00 |
| BaO | 13.0 | $SbO_3$ | 0.50 |
| $Yb_2O_3$ | 17.0 | $Er_2O_3$ | 0.1 |
| $Al_2O_3$ | 2.0 | $Cr_2O_3$ | .04 |

EXAMPLE IX

| | | | |
|---|---|---|---|
| $P_2O_5$ | 54.0 | CeO | 2.0 |
| $K_2O$ | 10.0 | $Nb_2O_3$ | 1.00 |
| CaO | 13.0 | $SbO_3$ | 0.50 |
| $Yb_2O_3$ | 17.0 | $Er_2O_3$ | 0.1 |
| $Al_2O_3$ | 2.0 | $Cr_2O_3$ | .050 |

EXAMPLE X

| | | | |
|---|---|---|---|
| $P_2O_5$ | 54.0 | CeO | 2.0 |
| $K_2O$ | 10.0 | $Nb_2O_3$ | 1.00 |
| ZnO | 13.0 | $SbO_3$ | 0.50 |
| $Yb_2O_3$ | 17.0 | $Er_2O_3$ | 0.1 |
| $Al_2O_3$ | 2.0 | $Cr_2O_3$ | .070 |

EXAMPLE XI

| | | | |
|---|---|---|---|
| $P_2O_5$ | 54.0 | CeO | 2.0 |
| $K_2O$ | 10.0 | $Nb_2O_3$ | 1.00 |
| CaO | 13.0 | $SbO_3$ | 0.50 |
| $Yb_2O_3$ | 17.0 | $Er_2O_3$ | 0.1 |
| $Al_2O_3$ | 2.0 | $Cr_2O_3$ | 0.1 |

EXAMPLE XII

In experiments determining the beneficial effects of ytterbium oxide in the glasses of the present invention, it was found that the limit of solubility were reached without a rollover in the output.

EXAMPLE XIII

FIG. 1 is an input/output diagram for the glasses of Examples I and V with PFN:350 μF, 230 μH; cavity: KC-331 filter; and output reflector: 85% R.

What is claimed is:

1. A phosphate laser glass composition comprising:
   approximately 50 to approximately 65 mole percent $P_2O_5$;
   approximately 10 to approximately 30 mole percent $R_2O$, where $R_2O$ is selected from the group consisting of $Li_2O$, $Na_2O$, $K_2O$, $Rb_2O$, $Cs_2O$ and combinations thereof;
   approximately 5 to approximately 25 percent MO, where MO is selected from the group consisting of MgO, CaO, SrO, BaO, ZnO and combinations thereof;
   up to approximately 10 mole percent $Al_2O_3$;
   up to approximately 1 mole percent $Nb_2O_5$;
   up to approximately 0.5 mole percent $Sb_2O_3$;
   up to approximately 4 mole percent $CeO_2$;
   approximately 0.01 to approximately 0.15 mole percent $Er_2O_3$;
   up to approximately 0.2 mole percent $Nd_2O_3$; and
   approximately 0.1 mole percent to the limit of solubility $Yb_2O_3$.

2. A phosphate laser glass composition, comprising:
   approximately 55 to approximately 60 mole percent $P_2O_5$;
   approximately 12 to approximately 25 mole percent $R_2O$, where $R_2O$ is selected from the group consisting of $Li_2O$, $Na_2O$, $K_2O$, $Rb_2O$, $Cs_2O$ and combinations thereof;
   approximately 8 to approximately 20 mole percent MO, where MO is selected from the group consisting of MgO, CaO, SrO, BaO, ZnO and combinations thereof;
   approximately 1 to approximately 8 mole percent $Al_2O_3$;
   up to approximately 0.8 mole percent $Nb_2O_5$;
   up to approximately 0.4 mole percent $Sb_2O_3$;
   up to approximately 3.5 mole percent $CeO_2$;
   approximately 0.02 to approximately 0.10 mole percent $Er_2O_3$;
   up to approximately 0.18 mole percent $Nd_2O_3$; and
   approximately 3 mole percent to the limit of solubility $Yb_2O_3$.

3. A phosphate laser glass composition which includes $P_2O_5$ as the primary glass constituent and oxides of erbium, cerium, chromium and ytterbium as dopants, said oxides each being present in a concentration sufficient to contribute to the laser output efficiency of said laser glass composition.

4. The phosphate laser glass composition recited in claim 3, wherein the concentration of erbium in mole percent of said glass composition is approximately 0.01 percent to approximately 0.6 percent.

5. The phosphate laser glass composition recited in claim 3, wherein said concentration of cerium in mole percent of said glass composition is approximately 0.1 percent to approximately 6 percent.

6. The phosphate laser glass composition recited in claim 3, wherein said concentration of chromium in mole percent of said glass composition is approximately 0.02 percent to approximately 0.1 percent.

7. The phosphate laser glass composition recited in claim 3, wherein said concentration of ytterbium in mole percent of said glass composition is approximately 0.1 percent to the limit of solubility.

8. The phosphate laser glass composition recited in claim 3, wherein said $P_2O_5$ is present in a concentration of approximately 50 to approximately 65 mole percent.

9. A phosphate laser glass composition having $P_2O_5$ as the primary glass constituent which includes in mole percent approximately 0.01 percent to 0.6 percent $Er_2O_3$, approximately 0.1 percent to 6.0 percent $Ce_2O_3$, approximately 0.025 percent to 0.1 percent $Cr_2O_3$, and approximately 0.1 percent to 10 percent $Yb_2O_3$.

10. The phosphate laser glass composition recited in claim 9, further including approximately 10 percent to 30 mole percent $R_2O$, where $R_2O$ is selected from the group consisting of $Li_2O$, $Na_2O$, $K_2O$, $RbO$, and $Cs_2O$, and combinations thereof.

11. The phosphate laser glass composition recited in claim 9, further including approximately 5 percent to 25 mole percent MO, where MO is selected from the group consisting of MgO, CaO, SrO, BaO, and ZnO, and combinations thereof.

12. The phosphate laser glass composition recited in claim 9, further including up to approximately 10 mole percent $Al_2O_3$.

13. The phosphate laser glass composition recited in claim 9, further including up to approximately 1 mole percent $Nb_2O_5$.

14. A phosphate laser glass composition which includes in mole percent approximately:
   50%–65% $P_2O_5$;
   0.01%–0.6% $Er_2O_3$;
   0.1%–6% $Ce_2O_3$;
   0.025%–0.1% $Cr_2O_3$;
   0.1%–limit of solubility $Yb_2O_3$;
   0.0%–10% $Al_2O_3$
   0.0%–1% $Nb_2O_5$
   10%–30% $R_2O$, where $R_2$ is selected from the group consiting or $Li_2O$, $K_2O$, $Rb_2O$, and $Cs_2O$ and combinations thereof; and
   5%–25% MO, where MO is selected from the group consisting of MgO, CaO, SrO, BaO, and ZnO, and combinations thereof.

* * * * *

UNITED STATES PATENT AND TRADEMARK OFFICE
CERTIFICATE OF CORRECTION

PATENT NO. : 4,962,067

DATED : October 9, 1990

INVENTOR(S) : John D. Myers

It is certified that error appears in the above-identified patent and that said Letters Patent is hereby corrected as shown below:

In column 10, claim No. 14, line 57, please delete "$R_2$" and substitute therefor-- $R_2O$ --; and in line 58, please add -- $Na_2O$ -- between $Li_2O$ and $K_2O$.

Signed and Sealed this

Seventeenth Day of November, 1992

*Attest:*

DOUGLAS B. COMER

*Attesting Officer*    *Acting Commissioner of Patents and Trademarks*